United States Patent [19]

Eckert et al.

[11] 4,258,591
[45] Mar. 31, 1981

[54] APPARATUS FOR CONTROLLING GEAR SHIFTS IN AUTOMATIC TRANSMISSIONS

[75] Inventors: Konrad Eckert, Stuttgart; Helmut Espenschied, Ludwigsburg; Georg Rothfuss, Sonthofen/Hüttenberg; Alexander Witte, Gerlingen, all of Fed. Rep. of Germany

[73] Assignee: Robert Bosch GmbH, Stuttgart, Fed. Rep. of Germany

[21] Appl. No.: 932,173

[22] Filed: Aug. 9, 1978

[30] Foreign Application Priority Data

Aug. 29, 1977 [DE] Fed. Rep. of Germany ....... 2738914

[51] Int. Cl.³ ........................ B60K 41/06; B60K 41/08
[52] U.S. Cl. ........................................ 74/866; 74/867; 74/870; 74/871
[58] Field of Search ................. 74/843, 844, 865, 866, 74/867, 868, 861, 870, 871

[56] References Cited

U.S. PATENT DOCUMENTS

| | | | |
|---|---|---|---|
| 2,692,511 | 10/1954 | Nallinger | 74/870 |
| 2,719,436 | 10/1955 | Nallinger | 74/865 |
| 3,398,607 | 8/1968 | Chana | 74/868 |
| 3,405,575 | 10/1968 | Searles et al. | 74/868 |
| 3,702,572 | 11/1972 | Wakamatsu et al. | 74/866 |
| 3,713,351 | 1/1973 | Sakakibara | 74/866 X |
| 3,732,754 | 5/1973 | Mori | 74/866 |
| 3,756,358 | 9/1973 | Espenschied et al. | 192/0.09 |
| 3,776,048 | 12/1973 | Enomoto et al. | 74/866 |
| 3,958,466 | 5/1976 | Espenschied | 74/867 |
| 4,026,169 | 5/1977 | Kuhnle et al. | 74/865 |
| 4,041,810 | 8/1977 | Harmon et al. | 74/868 |
| 4,073,203 | 2/1978 | Wurst et al. | 74/866 |

FOREIGN PATENT DOCUMENTS

| | | |
|---|---|---|
| 1155021 | 3/1964 | Fed. Rep. of Germany . |
| 1954783 | 5/1970 | Fed. Rep. of Germany . |
| 2036732 | 2/1972 | Fed. Rep. of Germany . |
| 2165707 | 8/1972 | Fed. Rep. of Germany . |
| 2537475 | 3/1977 | Fed. Rep. of Germany . |
| 1297460 | 11/1972 | United Kingdom . |

Primary Examiner—Leslie Braun
Attorney, Agent, or Firm—Frishauf, Holtz, Goodman & Woodward

[57] ABSTRACT

To improve vehicle operator comfort and safety and to reduce wear and tear on the automatic transmission, the apparatus prevents an upshift whenever the accelerator pedal is released very quickly. The apparatus stores the load signal which prevailed when the load was abruptly reduced, thereby simulating to the transmission controller a continuation of high load and preventing an undesired upshift, for example in downhill operation and during roll-outs. Normal load signals are restored whenever the accelerator pedal is returned to a predetermined point. In one embodiment, the stored load signal is a hydraulic pressure and in another embodiment, for use with an electronic transmission controller, the load signal is an electrical signal. In a third embodiment, the upshift control signal from the controller to the transmission is interrupted when the apparatus indicates a complete release of the accelerator pedal.

16 Claims, 5 Drawing Figures

APPARATUS FOR CONTROLLING GEAR SHIFTS IN AUTOMATIC TRANSMISSIONS

CROSS REFERENCE TO RELATED APPLICATIONS AND PATENT

Cross reference to applications and patent related to gear shift control systems, assigned to the assignee of this application:

U.S. Ser. No. 882,138, filed Feb. 28, 1978, SAUER et al;

U.S. Ser. No. 867,307, filed Jan. 6, 1978, REMBOLD et al;

U.S. Ser. No. 407,975, filed Nov. 11, 1964 now U.S. Pat. No. 3,310,991;

U.S. Ser. No. 883,873, filed Mar. 6, 1978, REMBOLD et al;

U.S. Ser. No. 867,332, filed Jan. 6, 1978, RABUS et al now U.S. Pat. No. 4,172,505;

U.S. Pat. No. 3,443,101;

U.S. Ser. No. 902,420, filed May 3, 1978, ESPENSCHIED.

BACKGROUND OF THE INVENTION

The invention relates to automatic transmissions of motor vehicles. More particularly, the invention relates to an apparatus for controlling the gear changing process in automatic transmissions under special conditions in which undesired gear shifting occurs. Such undesired gear shifting may take place, for example, if the vehicle is traveling downhill in intermediate gear and the operator lifts his foot from the accelerator pedal. The reduced load on the engine thus tends to cause the automatic transmission to shift upwardly which is contrary to the normal intentions of the operator. The invention thus relates particularly to stepwise operating automatic transmissions, i.e., such transmissions as include gear trains which are selectively coupled into the drive train to provide a number of discrete transmission ratios.

In known stepwise shifting automatic transmission, the shifting points of the transmission depend on the variables of vehicle speed and engine load. Normally, the vehicle speed is detected at the output shaft of the transmission whereas the load condition of the engine is determined from the instantaneous position of the throttle valve or the associated linkage, for example the gas pedal itself.

In hydraulic automatic transmissions, these variables are transformed into pressures which are applied to hydraulic comparators and are used to actuate control plungers which cause the engagement or disengagement of clutches or brake bands so as to block or release the rotation of planetary gears.

In known electronic transmission controls, the operating variables of the vehicle are transformed into electrical signals, in particular voltages, which are then applied to an electronic transmission control circuit containing, for example, multivibrators for controlling solenoid valves which then actuate various gear trains.

In both of the known and above-mentioned transmission control mechanisms, the conditions for shifting from one gear into the next depend on engine load and vehicle speed and can be represented in a load-speed diagram in which the shifting points are depicted as sloping straight lines. Such shifting diagrams determine the operation of the automatic transmission and may include the so-called kick-down shifting, i.e., the forcible downshift by full depression of the accelerator pedal. If, for example, a vehicle is operating at a point of the load-speed diagram which lies above an upshift curve, and if the engine load is reduced, for example, by releasing the gas pedal, the automatic transmission will shift into the next higher gear as determined by the upshift curve. In this manner, the operator of a vehicle equipped with an automatic transmission may control upshift to the next higher gear. However, an upshift of this type can also be annoying because it may not be desired each and every time the gas pedal is released. For example, if the vehicle happens to be traveling downhill or in a curve, the operator normally releases the accelerator at least partially so as to decrease the vehicle speed. In vehicles with manual transmissions, this action has the additional effect of engine braking which can be useful. However, in vehicles with automatic transmissions, the transmission is urged to shift upwardly so that the engine braking of the engine is reduced rather than increased. This type of characteristic in automatic transmissions is not only annoying but may actually constitute hazards in certain traffic situations. A further disadvantage of an automatic transmission occurs when the vehicle is permitted to slow down freely after the accelerator pedal is released. The transmission will sometimes first shift upwardly due to the apparent reduced load and then shift back down as the vehicle speed decreases. This type of operation tends to diminish the driving comfort and also introduces unnecessary wear and tear due to the superfluous shifting events.

In order to counteract the above-described disadvantages, especially in order to utilize engine braking in downhill operation, it is known in the art to provide manual switches which change or defeat the shifting characteristics of the automatic transmission or permit drivers to shift gears by hand. For example, in U.S. Pat. No. 3,732,754, Mori to which German Offenlegungsschrift No. 1 954 783, corresponds there is described an electronic controller for automatic transmissions in which the transducer which detects the accelerator pedal or throttle valve position has a stepped characteristic. The signal pattern of this transducer may be changed by a manual switch or by a switch which is actuated by the gradient of the terrain. Still further, the German Pat. No. 1 155 021 Burchardt describes a control mechanism for automatic gear changing in transmissions, especially for vehicles, in which a manually operated selection valve permits the retention or locking of the transmission in one of the customary driving ranges, i.e., P,R,N, D or L.

It is a disadvantage of these latter known devices that they require a manual engagement of the automatic transmission which runs counter to the general purpose of an automatically operating transmission.

Still further known in the art is an electro-hydraulic controller for an automatic transmission as described in U.S. Pat. No. 3,776,048, to which the German Published Application De-As 2 165 707 corresponds. In that disclosure, a switch located near the accelerator is actuated when the accelerator pedal is released and changes the shifting pattern of the automatic transmission in such a way that, when the accelerator pedal is released and the vehicle is operated at high speed, the transmission shifts from the highest to the next lower gear. The unavoidable downshift may be quite unpleasant at high vehicle speeds and may surprise the driver, thereby initiating a dangerous traffic condition. A further known control system described in the German Offenlegungsschrift No. 2 537 475 provides a switch operated by the accelerator pedal or by the engine exhaust brake which is closed when the accelerator pedal is released and which prevents an upshift or initiates a downshift at high speed. The enforced downshift is also a disadvantage of this apparatus.

THE INVENTION

It is a principal object of the present invention to provide an apparatus for controlling the operation of a stepwise operating automatic transmission in which the aforementioned disadvantages are prevented, in particular in which the unnecessary upshift of a vehicle operating downhill is prevented upon release of the accelerator pedal. It is a further object of the invention to provide a control mechanism in which the prevention of the upshift takes place when the accelerator pedal is abruptly released. Due to this characteristic, a vehicle equipped with an automatic transmission according to the present invention will function in a manner desired by the operator which may be assumed to be that, when the operator releases the gas pedal abruptly but not necessarily completely in downhill operation, in curves or in a slow deceleration, he neither wishes to initiate an upshift nor necessarily a downshift. It is a further advantage that the apparatus of the invention does not require manual engagement of the transmission which would be contrary to the purpose of an automatic transmission and may also require additional concentration on the part of the driver, leading to a hazard.

Briefly, the object is attained in fluids typically hydraulic, or electrically controlled automatic transmissions by providing switches which prevent an upshift of the transmission when the gas pedal is abruptly released. These switches may cause the magnitudes parameters to which the automatic transmission responds to be held at the level which they had just prior to the release of the gas pedal. A differential sensing element senses the abruptness of release.

By suppressing the undesired upshifts, the transmission is relieved of desired operation and its lifetime increased. Furthermore, when the vehicle operates downhill or in tight curves, the additional engine braking makes it possible to reduce the application of the wheel brakes, thereby reducing wear and tear on them.

In accordance with a first exemplary embodiment of the invention, the hydraulic plunger which responds to the load of the engine is modified and contains a locking valve for preventing the inflow of the fluid medium to the control valve.

In a second exemplary embodiment of the invention, the electrical signal which depends on the position of the accelerator pedal is held in a sample/hold circuit and is then passed to a known and customary electronic transmission control unit. The sample/hold circuit is activated whenever the undesired upshift is intended to be suppressed.

In a third exemplary embodiment of the invention, the engine speed signal is fed to the transmission control unit via an adjustable limiting circuit.

In a fourth exemplary embodiment of the invention, the upshifts are prevented by interrupting the conduction of upshift commands from the control unit to the transmission. The suppression takes place outside of the known transmission control apparatus and thus requires no change in its design.

It is an advantageous feature of all embodiments of the invention that it may be provided in association with known apparatus with relatively little additional expense. For example, in a hydraulic embodiment, the additional equipment required is only a very few hydraulic and pneumatic elements. In the electronic embodiments, only a very few customary circuit elements are used which can be provided with known technology and which use signals and voltages which are normally present in modern vehicles for other purposes.

The invention will be described by way of four examples with reference to the accompanying drawing.

DETAILED DESCRIPTION OF THE INVENTION

Figure 1:
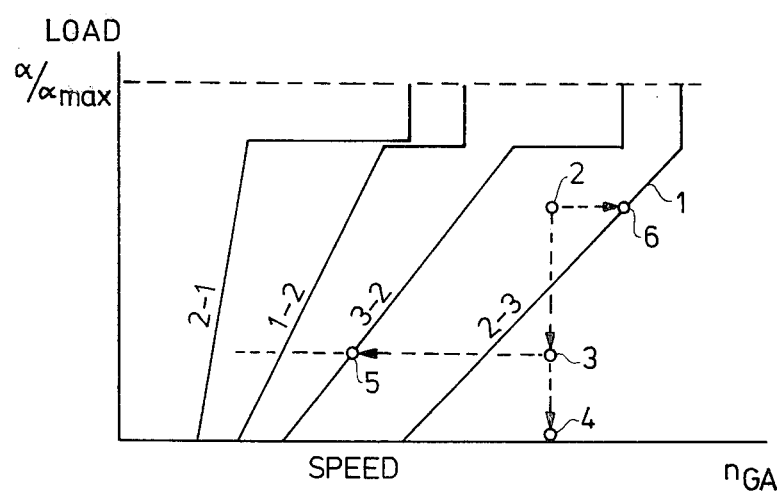
FIG. 1 is a diagram illustrating the programmed shifting points of a 3-speed transmission as a function of engine load and vehicle speed.

FIG. 1 is a so-called shifting diagram in which the intended shifting points of the transmission are plotted as a function of load and vehicle speed. The engine load is plotted on the ordinate as the relative angle of opening $\alpha/\alpha_{max}$ of the throttle valve whereas the vehicle speed is characterized by the output shaft speed of the transmission labeled $n_{ga}$. The various lines in the diagram indicate the shifting points of the transmission as a function of these variables. For example, if the operating point of the vehicle lies above the upshift curve 1, which illustrates the upshift from the second into the third gear, the transmission will be in second gear. If the operating point lies below the upshift curve 1, the transmission will be in third gear. These two operating points are indicated by the points 2 and 3, respectively. Assuming now that the vehicle operates at the point 2, i.e., in second gear, and with an at least partially depressed throttle, a reduction of throttle depression will cause a changeover to the operating point 3 resulting in an upshift from the second to the third gear when the upshift curve 1 is crossed. If the accelerator pedal is completely released, the operating point 4 will be reached. If, however, the accelerator pedal is held constant at the operating point 3, the vehicle speed will gradually decrease, thereby following the dashed line to the operating point 5 at which a downshift from third to second gear will take place. Thus, it will be appreciated that the known transmission controls cause a mandatory upshift when the accelerator pedal is released and possibly a subsequent mandatory downshift. As has been stated above, it is an object of the present invention to permit the operator to prevent the upshift during the change from the point 2 to the point 3 in particular by causing a very abrupt reduction of the amount of accelerator pedal depression. In some embodiments of the invention, it is possible to release the accelerator pedal entirely in order to provide a further control signal at the operating point 4. In the first three exemplary embodiments of the invention, the abrupt decrease of accelerator depression is used to store or hold the instantaneous load signal which is used as a control variable for the transmission control system. In the fourth exemplary embodiment of the invention, the upshift suppression is caused by preventing the upshift signal from reaching the transmission control unit when the accelerator pedal is released abruptly.

A special operating condition of the vehicle is that in which the vehicle is operated on a steep downgrade so that its speed increases even though the upshift has been suppressed, thereby finally reaching an operating point 6 at which an upshift will nevertheless occur. The third embodiment of the invention takes account of this possibility and provides an upper limit for the vehicle speed signal at the instant of abrupt release of the accelerator pedal so that no upshift may take place due to a speed increase but downshifts due to speed decreases are permitted.

Figure 2:
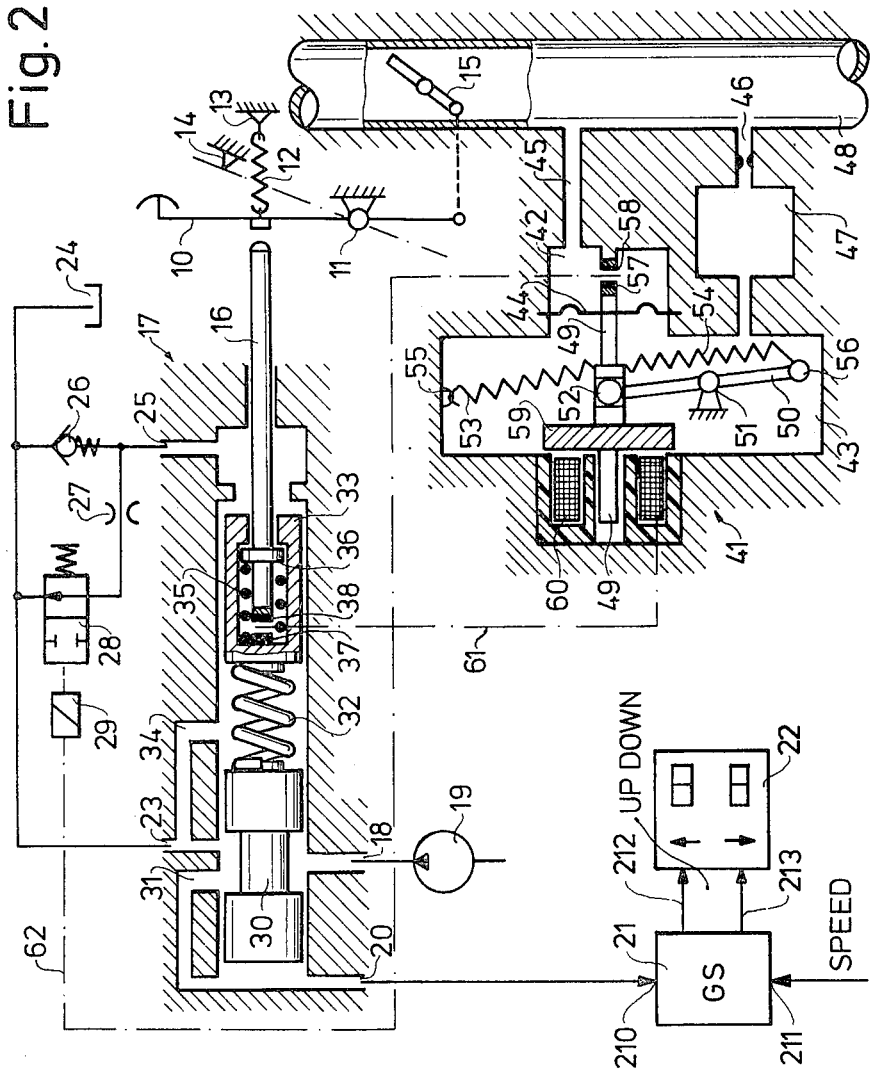
FIG. 2 is a schematic diagram of a first exemplary embodiment of the invention in a hydraulic-pneumatic version.

FIG. 2 is a schematic and partially sectional diagram of a first embodiment of the invention for use in a hydraulic/pneumatic environment. The accelerator pedal 10 of a motor vehicle is pivotably mounted on a locally fixed pivot 11 and is held in its rest position indicated in dash-dotted lines against a stop 14 by a spring 12 attached at the other end to a locally fixed point 13. By means of linkage, not shown but suggested by a dashed line, the accelerator pedal actuates a throttle valve 15 in the intake manifold of the engine which powers the vehicle. Associated with and capable of being displaced by the accelerator pedal 10 is the pin 16 of a sliding valve assembly 17. The sliding valve 17 has a fluid inlet 18 connected to a suitable pressurizing pump 19. A fluid opening 20 leads from the valve 17 to the load input 210 of a transmission control unit which includes a pressure comparator 21 which also receives information regarding other vehicle variables, for example the vehicle speed, via an input 211. An upshift control line 212 leads from the transmission control unit 210 to a suitable and known gearshift unit 22 as does a downshift line 213. A second fluid outlet 25 of the sliding valve 17 communicates via a check valve 26 as well as a throttle 27 and a switchable valve 28 with a fluid container 24. The switchable valve 28 is shown in the present embodiment as a 2-port, 2-position valve actuated by a solenoid 29. The valve control slide of the valve 17 includes a part 30 having a reduced diameter which permits the alternative communication between the fluid inlet 18 and either the first fluid outlet 23 or the fluid outlet 20 through the channel 31. The first portion 30 of the control valve slide is coupled by a helical spring 32 to the second part 33 of the valve slide. In the vicinity of the space occupied by the helical spring 32, the valve slide bore communicates through a channel 34 within the valve housing with the second fluid outlet 23. The second part 33 of the valve slide has a central bore containing a second helical spring 35, one end of which rests on the base of the bore while the other end rests on a shoulder 36 of the actuating pin 16. The pin 16 is disposed axially slidable in the central bore of the second part 33 of the valve control slide where its tip is provided with an electrical contact plate 38 which is intended to cooperate with a similar contact plate 37 affixed to the base of the bore within the part 33.

The embodiment illustrated in FIG. 2 further includes a snap-action switch 41 in which a diaphragm 44 defines a first pressure chamber 42 communicating through a channel 45 with the induction tube 48 as does a second pressure chamber 43 via a volume chamber 47 and a throttle 46 at a downstream point of the induction tube. Affixed to the diaphragm 44 is a contact pin 49 which is coupled to a lever 50 pivoting about a locally fixed joint 51 and attached to the pin 49 by a joint 52. A spring 53 is connected between one end of the pin 49 and/or the adjacent joint 52 and a locally fixed point 55 whereas a second spring 54 is connected between the pin 49 or the joint 52 and the far end 56 of the lever 50. The above-described construction of the snap-action switch 41 provides that the contact pin 49 assumes two stable axial positions. The end of the pin 49 remote from the joint 52 carries a contact plate 57 which cooperates with an opposite contact plate 58 mounted on the housing with electrical insulation.

In the rightmost stable position of the switch, (not shown) the contact plates 57, 58 make electrical contact whereas in the position shown they are separated. The leftmost end of the pin 49 as seen in the drawing further carries a ferromagnetic disc 59 which interacts with and may be displayed by a solenoid 60. The solenoid 60 is energized by contact of the plates 37,38 as suggested by the dash-dotted line 61. The union of the contact plates 57, 58 causes energization of the solenoid 29 via a dash-dotted line 62. Operation, with reference to FIGS. 1 and 2:

When the accelerator pedal is in its initial position resting against the stop 14 where it is held by the spring 12, it exerts no force on the pin 16 of the control slide in the valve 17. Under this condition, the fluid medium flows from the pressurizing pump 19 through the inlet 18 into the second fluid outlet 23 and hence into the container 24. The pressure at the first fluid outlet 23 and hence also the opening 20 is essentially zero, corresponding to the zero load position of the accelerator pedal 10.

When the accelerator pedal 10 is displaced from its zero position, it displaces the actuating pin 16 which eventually overcomes the force of the spring 35, causing electrical contact to be established between the plates 37 and 38 in the second part 33 of the control valve slide. This contact causes energization of the solenoid 60 in the snap-action switch 41 which thereby assumes its leftmost stable position as illustrated in FIG. 2 and opens the previously closed contact between the plates 57 and 58. When these contact plates are open, the control solenoid 29 of the valve 28 is no longer energized and the valve 28 assumes its normally opened position. At the same time, the force exerted by the accelerator pedal 10 is transmitted by the pin 16 via the helical spring 32 to the first part 30 of the valve slide. Accordingly, an increasing displacement of the accelerator pedal 10 causes a gradual closure by the first part 30 of the valve slide of the first fluid outlet 23. Accordingly, the pressure within the bore of the valve 17 increases and is transmitted via the channel 31 within the valve housing and the fluid outlet 20 to the load signal input 210 of the transmission control unit 21. The displacement of the accelerator pedal thus causes an increasing pressure to be applied to the load input 210, indicating an increasing engine load.

If, on the other hand, the accelerator pedal 10 is released slowly from its displaced position, the contacts 37, 38 are opened and the solenoid 60 is deenergized. However, the pin 49 of the snap-action switch 41 remains in its leftmost position due to the action of the springs 53, 54. Inasmuch as the slow release of the accelerator pedal 10 also results in a slow closure of the throttle valve 15, the vacuum in the induction tube 48 increases only slowly so that substantially the same pressure is maintained in the first chamber 42 via the relatively open communication 45 and in the second pressure chamber 43 via the throttle 46 and the volume chamber 47. In any case, the pressure difference is sufficiently small to prevent any excursion of the diaphragm 44. Accordingly, the switch formed by the plates 57, 58 remains open and the valve 28 remains in its normally opened position permitting the fluid medium to flow from the bore of the valve 17 through the second fluid outlet 25, the throttle 27 and the valve 28 into the fluid container 24. This permits a motion of the valve slide to the right in FIG. 2 corresponding to the release of the accelerator pedal 10. That motion gradually reopens the communication between the fluid inlet 18 and the first fluid outlet 23, thereby decreasing the pressure at the fluid outlet 20 and thus also at the load input 210 of the transmission control unit 21. If, on the other hand, beginning with a depressed state of the accelerator pedal 10 and, thus, a position of the valve slide of the valve 17 in the left part of the bore as seen in FIG. 1, the accelerator pedal 10 is abruptly released, the throttle valve 15 will also abruptly close off the induction tube 48, thereby causing a very rapid increase of the vacuum in the induction tube. Due to the relatively open connection 45, the first pressure chamber 42 experiences a high vacuum whereas the second pressure chamber 43 still experiences the previous elevated pressure because the sudden decrease of pressure communicates itself to the second chamber 43 only relatively slowly due to the presence of the throttle 46 and the volume chamber 47. In the meantime, the pressure difference between the chambers 42 and 43 causes the diaphragm 44 to be moved to the right as seen in FIG. 2, thereby switching the snap-action switch 41 in its rightmost position and causing electrical contact to be established between the two plates 57, 58. As a consequence, the solenoid 29 is energized, causing a switchover of the valve 28 into its closed, i.e., blocking, position. Due to the blockage of the valve 28, the fluid medium can no longer flow from the bore of the valve 17 through the third fluid outlet 25 so that the control slide remains in the position which it occupied just prior to the abrupt release of the accelerator pedal. As long as the control slide of the valve 17 remains in its position, the pressure signal transmitted from the fluid outlet 20 to the load signal input 210 of the transmission control unit 21 remains constant. In the previously discussed operating example illustrated in FIG. 1, the pressure signal fed to the control unit 21 is thus the signal associated with the operating point 2 rather than the actual operating point 3. As already discussed above, the result is a suppression of the upshift which would normally occur when the system crosses from the operating point 2 to the operating point 3.

If, after a sudden release of the accelerator pedal, it is then displaced again so as to move the pin 16 sufficiently far so as to close the contact between the plates 37, 38, the solenoid 60 is reenergized, causing the snap-action switch 41 to occupy its leftmost position. As a consequence, the electrical switch formed by the plates 57, 58 is opened and the solenoid 29 is deenergized. As a result, the valve 28 opens, permitting fluid medium to flow from the second medium outlet 25 via the throttle 27 and the valve 28 back to the container 24. This permits the motion of the valve slide to the right, thereby reducing the pressure signal at the load input 210 of the transmission control unit 21. The spring-loaded check valve 26 has a dual function. Its first purpose is to permit a rapid flow of pressure medium into the bore of the valve 17 when the accelerator pedal is rapidly depressed. A second purpose is to prevent a flow of fluid through the branch in which it is located in the opposite direction.

The throttle 27 has the purpose of causing a delay in the displacement to the right of the control slide when the accelerator pedal 10 is released so that the position occupied by the control slide at the time the accelerator pedal is abruptly released is retained. This is due to the fact that the throttle 27 causes the displacement of the control slide to the right to occur more slowly than the actuation of the snap-switch 41 and the subsequent actuation of the valve 28 which blocks the flow of fluid from the bore of the control valve.

Figure 3:
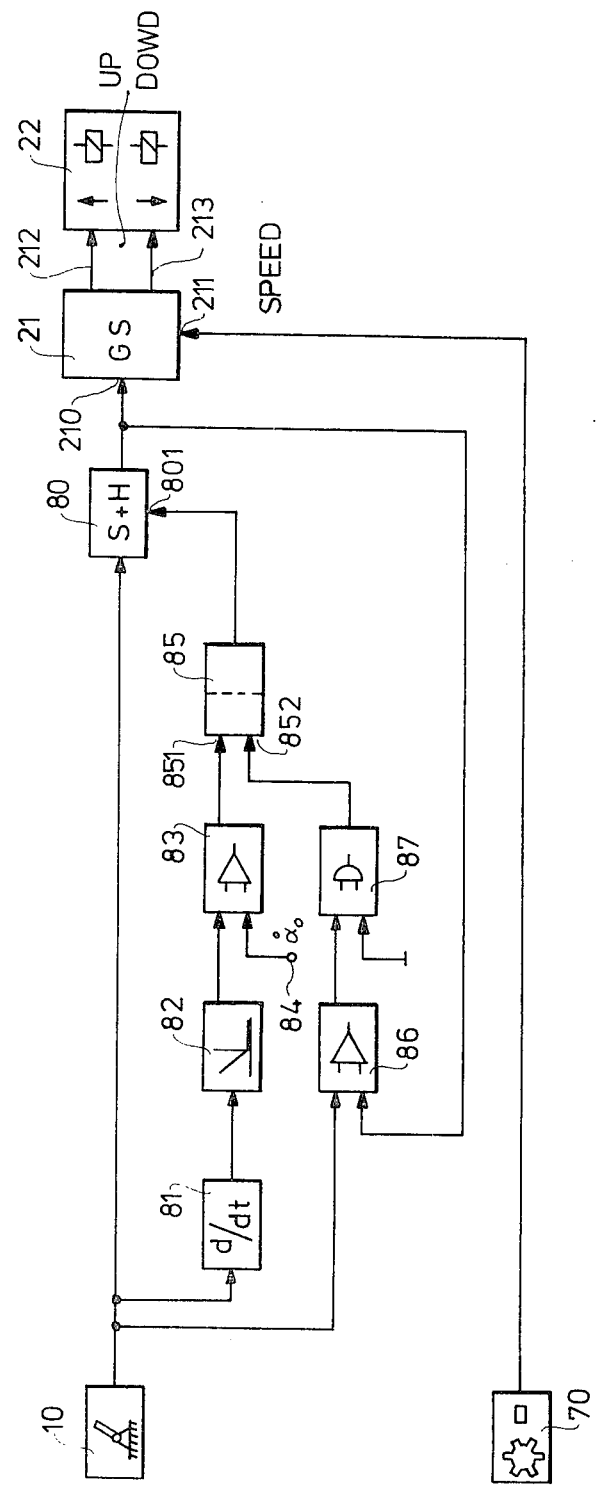
FIG. 3 is a block circuit diagram of a second exemplary embodiment of the invention applicable to electronic transmission control.

A second exemplary embodiment of the invention applicable to electronic transmission controls is depicted in a block diagram illustrated in FIG. 3. The accelerator pedal 10 includes a motion transducer which generates an analog signal which is fed to the analog input of a first sample/hold circuit 80 the output of which goes to the electronic load signal input 210 of the transmission control unit 21. As before, the transmission control unit 21 controls the operation of a transmission 22 via upshift and downshift lines 212 and 213, respectively. The transmission control unit 21 also receives a speed signal at an input 211 and generated by a tachogenerator 70 in dependence on vehicle speed. The accelerator pedal signal is also applied to the input of a differentiating circuit 81 and a circuit 82 which suppresses negative values of the incoming signal. The output of the circuit 82 is fed to the first input of a first comparator 83 whose other input 84 receives a comparison voltage. The output of the first comparator 83 is connected to the set input 851 of a flip-flop 85 whose output is connected to the hold input of the first sample/hold circuit 80. The analog signal which corresponds to the position of the accelerator pedal is also applied to the first input of a second comparator 86 whose second input receives the output from the first sample/hold circuit 80. The output of the second comparator 86 goes to the first input of a first AND gate 87 whose other input is grounded. The output of the first AND gate 87 controls the reset input 852 of the flip-flop 85. The pedal position signal generated by the unit 10 is fed to the signal input of the first sample/hold circuit 80 associated with the transmission control unit 21. It is the well known property of sample/hold circuits to pass on the signal present at their inputs, possibly amplified, as long as the hold-enable input is not energized. The operation of the sample/hold circuit in this condition may thus be compared with that of an amplifier. As soon as the hold-enable contact receives a signal however, the output signal from the circuit remains constant at the value which it occupied at the instant of occurrence of the hold-enable signal. In the example illustrated in FIG. 3 the hold signal of the first sample/hold circuit 80 is provided by the flip-flop 85. The particular construction of the first sample/hold circuit 80 is not critical to the present invention. Such circuits are known and are obtainable in ordinary commerce, for example under the type designation SHA-1A from, for example, the firm Analog Devices. As long as the hold-enable input 801 of the first sample/hold circuit is not actuated, the load signal reaching the input 210 of the transmission control unit 21 is a signal corresponding to the instantaneous and varying position of the accelerator pedal.

In order to obtain information regarding the abruptness of the change of the accelerator pedal position, the position signal is applied to the input of a differentiating circuit 81 followed by a circuit 82 which suppresses the positive values of the signal from the differentiating circuit 81, i.e., signals which correspond to a depression of the accelerator pedal 10, i.e., a motion tending to increase the engine speed. The output of the circuit 82 is thus a signal which indicates the rapidity of release of the accelerator pedal 10. This signal is compared with a set-point value applied to the contact 84 so that the first comparator 83 switches over and provides a signal of opposite type if the speed of release of the pedal 10 exceeds the predetermined set-point value. This adjustable value thus defines the speed of release at which the apparatus of the invention begins to function. The output of the first comparator 83 now sets the flip-flop 85 which, in turn, actuates the hold-enable input 801 of the first sample/hold circuit. Accordingly, when the accelerator pedal 10 is released sufficiently rapidly, the voltage corresponding to the position of the gas pedal at or near the time of release is retained at the output of the circuit 80, i.e., at the load input 210 of the control unit 21.

It is the purpose of the apparatus of the invention to disengage the hold circuit if the accelerator pedal is depressed again up to a position which it occupied at the time of its abrupt release. Accordingly, the output of the sample/hold circuit which represents the previously attained position of the accelerator pedal is constantly compared with the instantaneous pedal position at respective inputs of a second comparator 86 which resets the flip-flop 85 via the first AND gate 87 when the two input voltages are equal and thus releases the first sample/hold circuit 80. From this point on, the load signal 210 is proportional to the instantaneous position signal from the transducer associated with the accelerator pedal 10.

Figure 4:
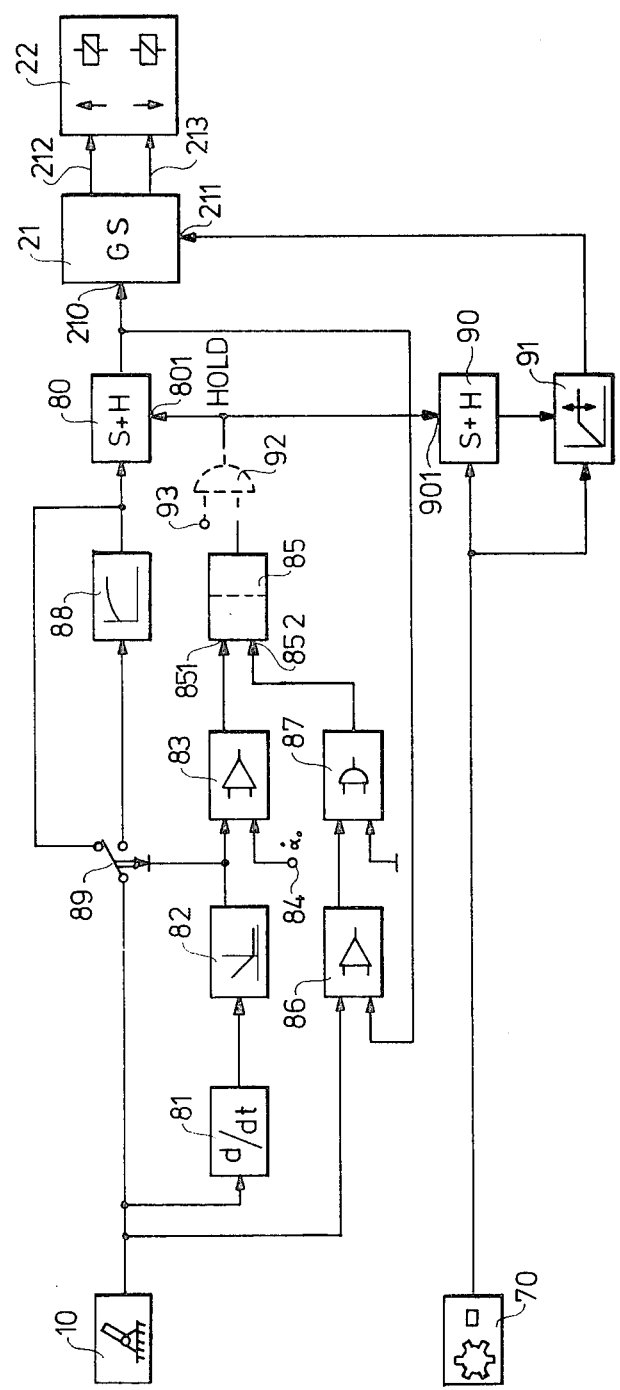
FIG. 4 is a block diagram of a third embodiment of the invention also applicable to electronic transmission control.

A third exemplary embodiment of the invention is depicted in schematic form in FIG. 4. In this embodiment, also intended for use with an electronic transmission control unit, most of the elements are identical to those previously described with respect to FIG. 3 and retain the same reference numerals. Among the additional elements in a first delay circuit 88 connected between the accelerator pedal 10 and the input of the sample/hold circuit 80. The delay circuit 88 may be switched in or out of the circuit by a switch 89 actuated by the output signal from the circuit 82. As a further change with respect to the circuit of FIG. 3, the third embodiment illustrated in FIG. 4 provides a connection between the tachogenerator 70 and the input of a second sample/hold circuit 90 whose output goes to the control input of a signal limiter 91 connected between the tachogenerator 70 and the speed signal input 211 of the control unit 21. The hold-enable contact 901 of the second sample/hold circuit 90 is connected to the output of the flip-flop 85 as is that of the circuit 80. As a possible variant of the embodiment illustrated in FIG. 4, an AND circuit 92 may be connected as shown between the output of the flip-flop 85 and the hold-enable line 801 or 901. The second input 93 of the gate 92 is intended to receive a signal which will control the enabling of the sample/hold circuits 801, 901, for example a signal related to the fully released position of the accelerator 10 as will be discussed below. The operation of the embodiment of FIG. 4 differs from that of FIG. 3 in the following way:

The propagation of signals related, respectively, to accelerator pedal depression and release may suitably occur with different delays. For example, the operator of a vehicle should at all times be able to cause vehicle acceleration without delay whereas it might be advisable to communicate the reduction in load to the transmission with some built-in delay. In the embodiment illustrated in FIG. 2, this delay is provided by the throttle 27 which causes reduced hydraulic flow, whereas, in the present embodiment of FIG. 4, there is provided the first delay circuit 88 which is coupled into the connection between the pedal 10 and the control unit 21 if the circuits 81 and 82 indicate that the accelerator pedal is being released, whereas when it is being depressed, the differentiated signal from the circuit 81 is blocked and the circuit 82 and the switch 89 permit direct passage of the signal from the pedal 10 to the sample/hold input of the circuit 80. When the circuit 82 indicates a release of the pedal 10, the switch 89 inserts the circuit 88 causing a delay of the signal fed to the sample/hold circuit 80.

Similarly, the output of the tachogenerator 70 is not applied directly to the speed signal input 211 of the control unit 21 but only via a controllable signal limiting circuit 91. The limiting magnitude set in the limiting circuit 91 is supplied by the output of the second sample/hold circuit 90 which, as already discussed, normally follows the input signal, possibly with some amplification, in this case just sufficiently amplified to be slightly larger than the speed signal applied directly to the input of the limiting circuit 91. Thus, during normal operation of the vehicle, i.e., when the accelerator pedal is not abruptly released and the second sample/hold circuit 90 is operating in its sample mode, the signal fed to the speed input 211 is undistorted and unlimited. If, however, the flip-flop 85 actuates the hold-enable input 901, the sample/hold circuit 90 goes to its hold mode, thereby holding the signal limit in the limiting switch 91 at whatever value was present at the moment of actuation by the flip-flop 85. Accordingly, all the signals reaching the input 211 of the control unit 21 will be either smaller than or equal to the latched magnitude of the speed signal provided by the sample/hold circuit 90. Referring to the shifting diagram of FIG. 1, the latching of the speed signal relates to the condition in which the vehicle starts at the operational point 2 and, even though the gas pedal is released, it gains speed and passes to the operational point 6 due, for example, to being operated on a steep downhill grade so as to tend to initiate an upshift into the higher, i.e., third, gear. By limiting the speed signal, i.e., by simulating the speed at the operational point 2 even though the vehicle is actually at the point 6, the upshift is prevented. When the speed signal is thus limited, a governor may have to be provided to prevent overspeed of the engine in low gear operation.

In the previously described embodiments, the latching of the load and/or speed signals was initiated by an abrupt release of the gas pedal 10. In some cases, it may be useful to generate and use a further condition for latching one or the other of these signals, in particular a signal related to a fully released accelerator pedal. Such a provision has been indicated in the embodiment of FIG. 4 by the presence of the AND gate 92, shown in dashed lines. The output signal of the flip-flop 85 will pass the AND gate 92 only if the second input 93 receives an appropriate signal indicating a fully released, i.e., zero, position of the accelerator pedal. This signal may be produced by any suitable and known switch. If the AND gate 92 is connected as shown, the load and-/or speed signal is latched only if at the same time the accelerator pedal was abruptly released and subsequently assumes its rest position.

Figure 5:
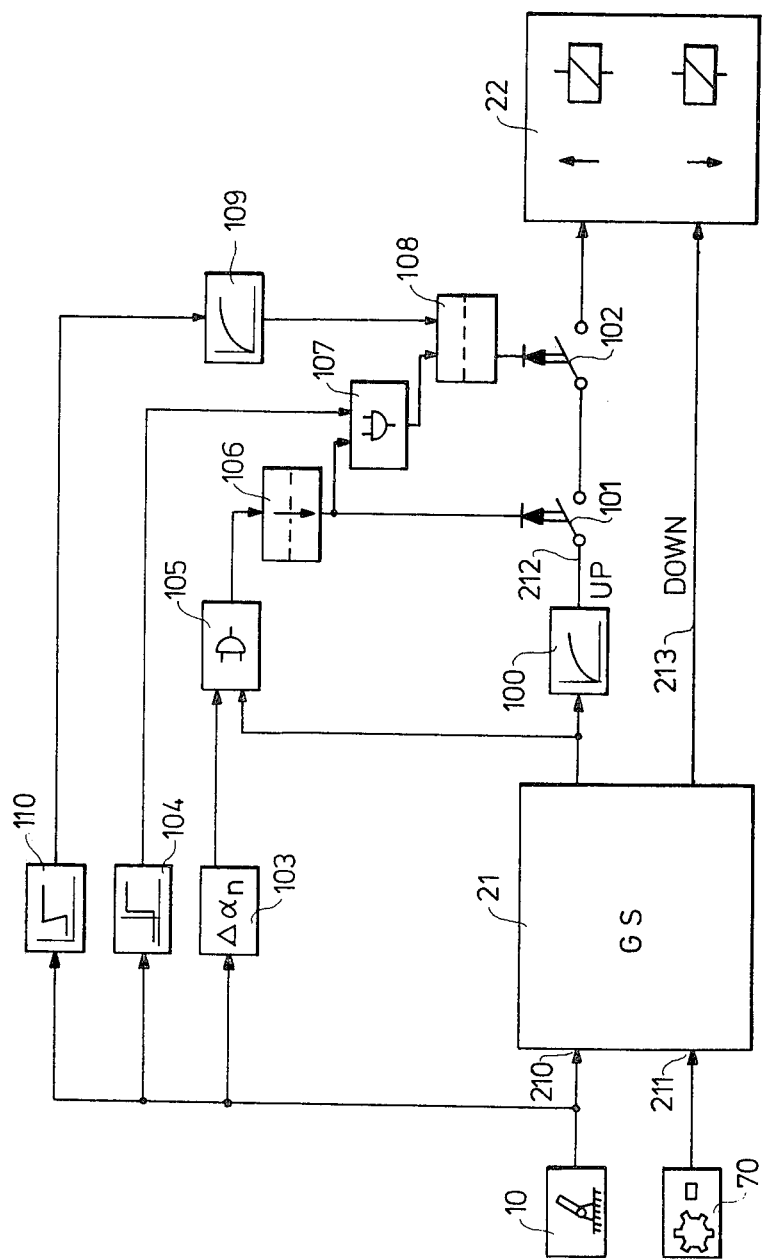
FIG. 5 is a block diagram of a fourth embodiment of the invention for electronic transmission control.

A fourth exemplary embodiment of the invention is depicted in FIG. 5. This embodiment is executed in substantially digital form and is intended to be associated with a substantially digital gearshift control unit, whereas the previous embodiments of FIGS. 3 and 4 were primarily analog oriented. A digital transmission control unit with which the present embodiment may be used is described, for example, in British specification No. 1,297,460, assigned to the assignee of this application, to which the German Offenlegungsschrift No. 2 036 732 corresponds. The embodiment of FIG. 5 includes a second delay element 100 as well as switches 101, 102 which are connected in series with the delay circuit 100 in the upshift signal line leading to the transmission 22. The load signal from the accelerator pedal 10 is supplied, in addition to the load signal input 210 of the unit 21, to a difference forming stage 103, a null value indicator 104 and a threshold switch 110. The output of the difference forming circuit 103 is connected to the first input of a third AND gate 105 whose second input is connected to the upshift line 212. The third AND gate 105 controls a monostable multivibrator 106 whose output is connected to the control input of the first switch 101 and to the first input of a fourth AND gate 107. The second input of the fourth AND gate 107 is connected to the output of the null detector 104 and its output is connected to the set input of a flip-flop 108. The reset input of the flip-flop 108 is connected via a third delay element 109 to the output of the threshold switch 110. The operation of the circuit illustrated in FIG. 5 is as follows. The difference forming circuit 103 generates digital values corresponding to the position of the gas pedal and also forms the difference of sequential values. If this difference becomes negative, i.e., if the load is diminished, the third AND gate 105 receives an appropriate actuating signal. If, at the same time, the transmission control unit 21 has determined that an upshift is due and places an appropriate signal on the upshift line 212, the third AND gate 105 triggers the monostable multivibrator 106 which, in turn, opens the first switch 101 for a short period of time, for example 500 milliseconds. The opening of the switch 101 for this period of time prevents the arrival of the upshift signal from the unit 21 at the transmission 22 before the circuits 103, 105, 106 are able to determine if the signal on the line 212 should actually be blocked. When the multivibrator 106 returns to its stable state, the AND gate 107 responds depending on whether the gas pedal has in the meantime achieved its zero or fully released position. If such is the case, as indicated by the circuit 104, the flip-flop 108 is set, thereby opening the second switch 102. Accordingly, if the transmission control unit 21 has determined that an upshift is required and if, at the same time, the load is diminished, i.e., the gas pedal is released, the upshift command is suppressed for a short period of time at the expiration of which a determination is made if the accelerator pedal 10 had reached its idling or fully released position. If this is the case, the upshift command is definitely suppressed and the upshift is prevented. The time delay introduced by the monostable multivibrator 106 should be of a magnitude which permits suppression of the upshift only when the accelerator pedal is abruptly released, i.e., if the fully released position of the pedal 10 is attained within the time constant of the multivibrator.

The flip-flop 108 is reset by a signal which is generated by the threshold switch 110 and is passed to the reset input via the third delay element 109. This signal will be provided if the accelerator pedal 10 has been depressed again and has reached a predeterminable value. One purpose of the third delay element 109 is to suppress spurious pulses which might cause erroneous resetting of the flip-flop 108 and another purpose is to cause a delay which prevents an upshift when the accelerator pedal 10 is depressed again. This can happen if the set-point value in the threshold switch 110 is low or zero for, in that case, the direct actuation of the reset input of the flip-flop would cause an upshift as may be seen from the diagram of FIG. 1. If the accelerator pedal 10 is fully released and an upshift is suppressed due to an open switch 102, the vehicle will be operating at the point 4. If the set-point of the threshold switch 110 is very low, for example at the level of the operating point 2 or at zero, and if that set-point is exceeded by the actual value signal from the pedal 10, the switch 102 will be closed and the upshift signal will pass via the line 212 because the vehicle is at a point lying below the upshift curve 1. If, however, the output signal from the threshold switch 110 is delayed somewhat, the operating point of the vehicle will again be above the upshift curve 1 at the time of closing of the switch 102. Thus the insertion of the third delay element 109 permits the operator to leave the operating region below the upshift curve 1 without triggering an actual upshift of the transmission.

Various changes and modifications may be made within the inventive concept.

What is claimed is:

1. An apparatus for controlling the shifting characteristics of stepped automatic transmissions for motor vehicles, said automatic transmissions including a transmission unit, a fluid or electrical transmission control unit and means for providing a variable fluid or electrical input signal to the transmission control unit based on the degree of depression of the accelerator pedal, and comprising means including differential means (42, 43, 45, 46, 47; 81; 103) for sensing abrupt release of the accelerator pedal from a previously depressed position;

and switching means coupled to and controlled by said sensing means connected to the transmission control unit when the sensing means sense that the accelerator pedal is being abruptly released, said switching means inhibiting upshift of the transmission upon response of the sensing means.

2. An apparatus according to claim 1, further including means for holding the value of said input signal at the level which it had at the instant of release of the accelerator pedal; whereby an upshift of the transmission is prevented.

3. An apparatus according to claim 2, further including means for permitting the variation of the input signal when the accelerator pedal reaches a degree of depression corresponding to the previously attained value.

4. An apparatus according to claims 1, 2 or 3, wherein said switching means includes a slide valve (17) which provides to said transmission control unit a hydraulic pressure the magnitude of which constitutes said input signal, said slide valve 17 including a first plunger part

(30) for providing selective communication between a source of pressurized fluid (18) and a fluid opening (20) communicating with an input (210) of said transmission control unit (21).

5. An apparatus according to claim 4, wherein said control slide further includes a second plunger part (33) coupled to said first part (30) by a helical spring (32), said second part (33) having an axial void containing and guiding the axial motion of a pin (16), said pin being disposed to be moved axially by said accelerator pedal and being provided with electrical contacts which can provide electrical continuity upon displacement by said accelerator pedal, said valve assembly (17) further including a second fluid outlet (25) the flow through which is controlled by a switchable valve (28) for permitting fluid flow through said switchable valve (28) to a pressureless container (24), and said apparatus further including switch means (41) and an actuator (29) for switching said switchable valve (28) to open and close the flow through said second fluid outlet (25) and wherein said contacts (37) and (38) are connected to operate said switch means (41).

6. An apparatus according to claim 5, wherein said switching means (41) is a diaphragm operated switch having a diaphragm (44) defining a first pressure chamber (42) and separated therefrom a second pressure chamber (43), and there is attached to said diaphragm (44) a contact pin (49) and a linkage (50) and springs (53,54) for placing said contact pin (49) in one of two stable positions, respectively related to the opening and closing of electrical contacts (57, 58) one of said electrical contacts being attached to said contact pin (49) and the other being locally fixed in said switch means (41), said first pressure chamber (42) being coupled directly to the induction tube of the engine within the vehicle and said second pressure chamber (43) being coupled to the same induction tube via a throttle (46) and a volume chamber (47) to place contact pin (49) in one of its stable states when the pressure in said first pressure chamber (42) is different from the pressure in said second pressure chamber (43) and wherein said apparatus further includes a solenoid (60) for placing said contact pin (49) in its second stable position.

7. An apparatus according to claims 1, 2 or 3, wherein said input signal for said transmission controller (21) is an electrical voltage whose magnitude corresponds to the position of the accelerator pedal (10) and which is applied to the input of a first sample/hold circuit (80) and is further applied to a differentiating circuit (81) forming the differential means, the output of said differentiating circuit (81) being fed to a circuit for suppressing negative signals (82), the output thereof being applied to one input of a first comparator (83) the second input (84) of which receives a voltage from a set-point generator, the output of said first comparator (83) being applied to the hold-enable input (801) of said sample/hold circuit (80).

8. An apparatus according to claim 7, further comprising a flip-flop (85) the output of which is connected to the hold-enable input (801) of said sample/hold circuit (80), and the set input (851) of which is connected to the output of said first comparator (83), while its reset input (852) is connected to the output of a comparator circuit (86) whose second input receives the output of said sample/hold circuit (80); whereby, when the inputs to said second comparator (86) are equal, said comparator generates an output signal.

9. An apparatus according to claim 8, further comprising an AND gate (87) one of whose inputs is connected to the output of said comparator (86) and the other of whose inputs is grounded, its output being connected to the reset input (852) of said flip-flop (85).

10. An apparatus according to claim 7, further comprising a first delay circuit (88) and means for inserting said delay circuit (88) selectively into the circuit between said accelerator pedal (10) and the signal input of said sample/hold circuit (80).

11. An apparatus according to claim 7, further comprising a tachogenerator (7) for generating a signal related to vehicle speed and a signal limiter circuit (91) for limiting the signal from said tachogenerator, the output thereof being applied to a speed signal input (211) of said transmission control unit (21) and still further comprising a second sample/hold circuit (90) which is hold-enabled at a contact (901) by the output from said flip-flop (85) and whose output sets the limiting level of said limiting circuit (91); to selectively limit the speed signal applied to said transmission control unit (21).

12. An apparatus as defined by claim 11, further comprising a second AND gate (92) connected between the output of said flip-flop (85) and the hold-enable inputs (801 and 901) of said sample/hold circuits (80,90), respectively, a second input of said AND gate (92) being adapted to receive a signal indicating a particular position of said accelerator pedal (10).

13. An apparatus according to claim 1, wherein said switching means control interruption of the path of communication of signals along a line (212) which normally transmits upshift signals from said transmission control unit (21) to said transmission (22).

14. An apparatus according to claim 1, wherein said switching means include a timer circuit (106) which can interrupt communication along said upshift line (212) for a predetermined amount of time when an upshift signal is provided by said transmission control unit (21) with simultaneous release of said accelerator pedal (10) and which further includes means for interrupting the upshift line (212) prior to the expiration of the time interval provided by said timing circuit (106) if the position of the accelerator pedal (10) has reached a predetermined value.

15. An apparatus according to claim 1, further including a difference forming circuit (103) whose input is connected to the signal output of said accelerator pedal (10) and which forms differences of successive values relating to successive positions of the accelerator pedal and forming the differential means the output of which is connected to one input of an AND gate (105) whose other input is connected to said upshift line (212), the output of said AND gate (105) being applied to the triggering input of a monostable multivibrator (106) the output of which is connected to the control input of a switch (101) which is inserted in said upshift line (212) and is capable of interrupting electrical communication thereacross upon command by said flip-flop (106), said apparatus further including an AND gate (107) one input of which is connected to the output of said multivibrator (106), and the other input of which is connected to the output of a null detector (104) which has an input connected to the output of said accelerator pedal (10), and wherein the output of said AND gate (107) is connected to the set input of a flip-flop (108) whose output controls a second switch (102) inserted in said upshift line (212), the reset input of said flip-flop (108) being connected to the output of a signal delay circuit (110) the input of which is connected to receive the signal related to the position of said accelerator pedal (10).

16. Apparatus according to claim 1, wherein the differential means comprises a pair of chambers (43, 44), a diaphragm (41) separating said chambers, one of said chambers being in direct communication with the induction tube of the engine and the other chamber being in communication with the induction tube of the engine through a path including a throttle (46) and a volume chamber (47);

the switching means being coupled to said diaphragm.

* * * * *